April 18, 1933.  C. A. W. VOIGT  1,904,179
HOT WATER HEATING FURNACE
Filed June 15, 1931  2 Sheets-Sheet 1
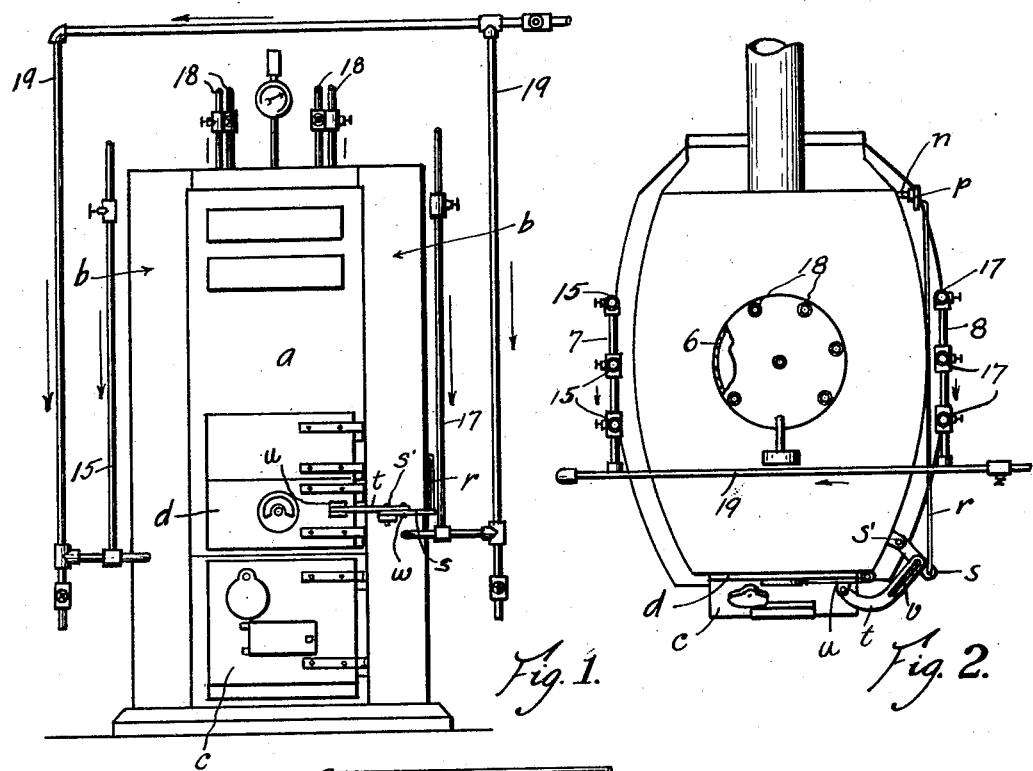
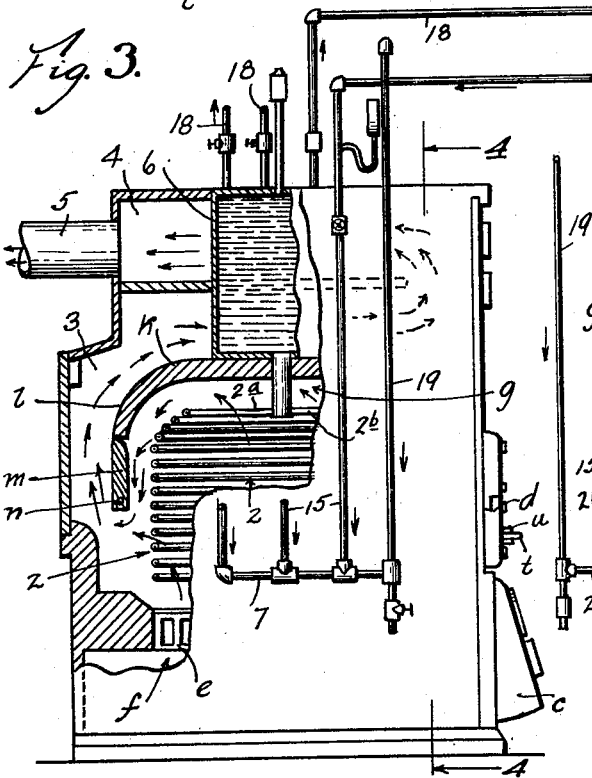
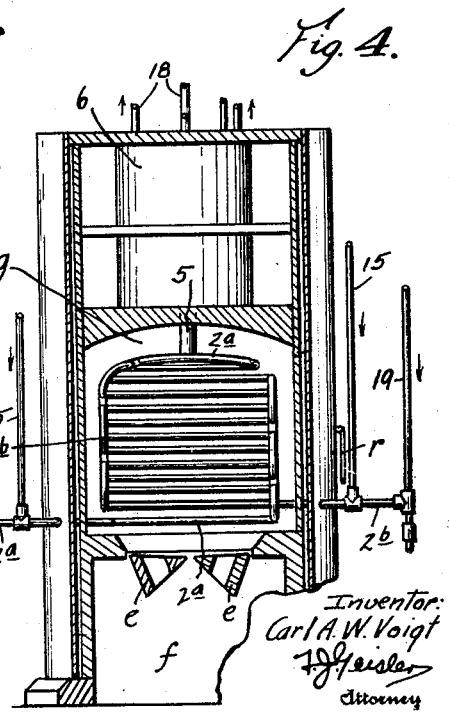

April 18, 1933.     C. A. W. VOIGT     1,904,179
HOT WATER HEATING FURNACE
Filed June 15, 1931     2 Sheets—Sheet 2
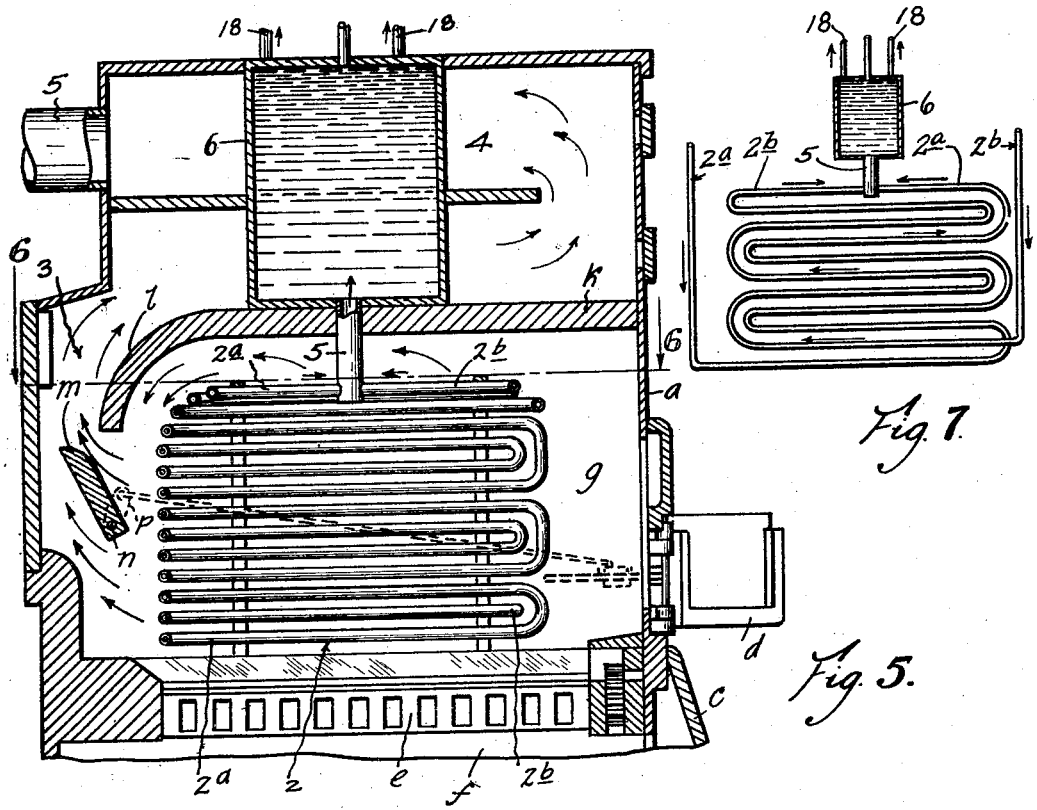

Patented Apr. 18, 1933

1,904,179

UNITED STATES PATENT OFFICE

CARL A. W. VOIGT, OF PORTLAND, OREGON

HOT WATER HEATING FURNACE

Application filed June 15, 1931. Serial No. 544,487.

My invention relates to hot water heating furnaces and the like.

In hot water heating apparatus it is essential for the most efficient operation that the furnace be economical of fuel and capable of quickly raising the temperature of the water to the desired degree for heating the house or building in which it is located.

To attain this result two features must be present. First, the hot gases of combustion must pass uniformly over the entire heating surfaces of the furnace, that is, the gases of combustion be prevented from selecting the lines of least resistance and flowing through them at a relatively high velocity to the neglect of other portions of the heating surface.

Second, the heating surface of the coils or tubes relatively to the volume of water to be heated, must be such as to provide the most efficient absorption of heat by the water and hence economy of fuel, and at the same time the length of the coils be such as not to retard the circulation of the water and hence require increased volumes of fuel to maintain the water in the radiators at the desired temperature.

Therefore, the object of my invention is to provide a furnace adapted to cause the hot gases of combustion to pass uniformly over all portions of its heating surface, whereby the heating medium, specifically hot water, may be quickly raised to and economically maintained at the desired temperature.

A further object of my invention is so to construct my furnace that circulation of the gases of combustion in the combustion chamber will be momentarily retarded and thus held in contact with its heating surfaces for a time to assure an efficient absorption of heat by the latter.

A further object of my invention is to provide a hot water furnace, the water coils of which are adapted to provide a maximum degree of heating surface relatively to the volume of water to be heated and to permit rapid circulation of the water therethrough, and thus provide efficient and economical transmission of the heating medium through the apparatus.

To this end I provide a number of sets of independent coil-units leading to a common hot water drum, each set being connected to the return pipes of a group of radiators, whereby I divide the total volume of water to be heated into smaller independent volumes which may be more quickly and economically heated to the required temperature.

Further, by such arrangement I reduce the relative lengths of the said coils and thus reduce the frictional resistance to the water flowing through them and provide more rapid circulation of the heating medium through the system.

A further object of my invention is to provide a movable section in the rear wall of the combustion chamber of my furnace adapted to be opened by the opening of the combustion chamber to permit the gases of combustion to pass more directly from the combustion chamber to the smoke pipe and thus the gases of combustion will not, when the door is opened, follow the line of least resistance and pass out the door in the form of smoke.

These and other incidental features of my invention, the details of construction and mode of operation are hereinafter fully described with reference to the accompanying drawings.

In the drawings:

Fig. 1 shows a front elevation of my furnace and illustrates the relative arrangement of the return and supply pipes therefor;

Fig. 2 shows a plan view of the same with a portion broken away to illustrate the location of the hot water drum;

Fig. 3 shows a side elevation of my furnace partly in section to illustrate the construction and arrangement of the combustion chamber;

Fig. 4 shows a section taken on the line 4—4 of Fig. 3 and illustrates the arrangement of the coils located in the combustion chamber;

Fig. 5 shows a section taken on the line 5—5 of Fig. 6 and further illustrates the arrangement of the coils;

Fig. 6 shows a section taken on the line 6—6 of Fig. 5 and illustrates further details of construction; and Fig. 7 shows a diagrammatic view of the coils removed from the furnace and illustrates how they are intercoiled in order to line the roof, rear and side walls of the combustion chamber.

Referring now to the figures, my furnace comprises a housing $a$ provided with an insulating outer casing $b$ at the sides and with an ash pit door $c$ and combustion chamber door $d$ at the front. A grate $e$, more or less of the usual form, is provided within the housing $a$ and spaced above the ash pit $f$, which forms the bottom of the fire box or combustion chamber $g$.

The roof $k$ of the combustion chamber $g$, see Fig. 5, is curved downwardly at the rear, as at $l$, and is provided with a hinged extension or damper $m$ mounted fast upon a shaft $n$, and normally held in closed position and extends downward to a point relatively close to but terminating above the bottom of the combustion chamber, as shown in Fig. 3.

The hot gases of combustion, which arise from the fuel on the grate $e$, are momentarily trapped or retarded under the roof $k$ and then caused to pass rearwardly and downwardly, see Fig. 3, under the damper $m$, but the draft is not impeded to the point where the efficiency of the furnace would be reduced. By these means the gases of combustion are held in uniform contact with water coils 2, hereinafter further to be described, which are located in the combustion chamber $g$ and thus are prevented from passing so rapidly over the said coils 2, as to prevent the effective absorption of the heat and of the gases by the coils.

The gases of combustion, after passing under the damper $m$, are conducted upwardly through a flue 3 and over the upper surface of the roof $k$ of the combustion chamber and then turned back through a flue 4 from where they pass out through the smoke pipe 5 and thus are further retarded in their passage through the furnace. A hot water drum 6 is centrally located in the flues 3 and 4, about which the hot gases of combustion circulate and maintain the temperature of the water in the said drum at the temperature at which it is received from the coils and also heat loses through radiation from the said drum are prevented.

Further, by this construction the heat conducted through the roof $k$ of the combustion chamber tends to reheat the gases of combustion and the hot water drum as they pass through the flues and effect a further utilization of the heat of the said gases.

The shaft $n$, see Fig. 5, upon which the damper $m$ is mounted extends through the body $a$ at one end and has a crank arm $p$ secured thereto. A rod $r$ is provided connecting the said crank arm $p$ to a lever $s$ pivoted adjacent the hinge of the combustion chamber door $d$, as at $s'$. A bell crank lever $t$ is pivotally mounted upon a lug $u$ provided upon the said door $d$ and is formed with a slot $v$ in which rides a pin $w$ carried by the said lever $s$. By this construction, when the combustion chamber door $d$ is opened, the damper $m$ will be moved to the position shown in Fig. 5 and when closed the damper will likewise be closed in the position shown in Fig. 3.

The before mentioned coils 2 comprise two similar sets of coil units $2a$, $2b$ of equal length, which, as illustrated in detail in Fig. 6 and diagrammatically in Fig. 7, enter from opposite sides of the combustion chamber $g$ at the bottom and are intercoiled one with the other, so as to rise in U-shaped arrangement and line the sides and rear of the combustion chamber, see Figs. 5 and 6, and then at the top are intercoiled in a dome-like arrangement and line the top of the said combustion chamber. Thus each coil-unit lines the sides, top and rear of the combustion chamber. The coil-units $2a$, $2b$ are connected at the top through a common inlet 5 to the bottom of the hot water drum 6.

The coil-unit $2a$ is connected through a pipe 7 to return pipes 15 leading from a group of the radiators of the apparatus and the coil-units $2b$ are similarly connected on the other side of the combustion chamber through a pipe 8 to return pipes 17 leading from another group of the said radiators.

Supply pipes 18 are provided for the said radiators leading from the top of the hot water drum 6 and a cold water supply pipe 19 is provided connected into the pipes 7, 8 leading to the coil-units $2a$, $2b$. The cold water supply pipe 19 is connected either to the city water main under normal pressure, or to a suitable pressure tank, whereby the system will be constantly supplied with cold water. Thus the circulation of the water through the said coils $2a$, $2b$ is produced solely by convection and any expansion of the water or steam is accommodated by backing into the said main or storage tank.

Such arrangement of the coil-units $2a$, $2b$ which lines the sides, top and rear of the combustion chamber provides a maximum amount of heating surface without restricting the area of the interior of the combustion chamber.

Also by providing independent sets of coil-units 2a, 2b, I divide the total volume of water to be heated into smaller volumes which may be more rapidly heated by the same amount of heat energy. Further, by dividing the coils into separate units, I provide a relatively greater amount of heating surface for a given volume of water.

For if a single coil were provided for all the radiators, its size must necessarily be increased to carry a sufficient volume of water, in which event the circumferential areas of the coil will be less relatively to its volumetric area and hence the relative heating surface of the coil will be reduced. This is evident, for it is well known that the circumferences of circles are to each other as their diameters, but the areas of circles are to each other as the squares of their radii, and hence two cylinders of equal diameter will have a greater total circumference than one cylinder having a volumetric area equal to the sum of the said two cylinders.

I claim:

1. In a hot water heating apparatus, a combustion chamber provided with a dome-like roof and a rear wall extending to a point relatively close to the bottom of the combustion chamber, whereby the products of combustion are momentarily retarded and held in said combustion chamber, a flue chamber located over said combustion chamber and a passageway leading from under said rear wall of the combustion chamber to said flue chamber, a series of units of hot water coils arranged along three sides and the roof of the combustion chamber, the return pipes of the apparatus being connected in groups to the coil units, respectively, a hot water drum centrally located in said flue chamber to which said coil units are connected.

2. In a hot water heating apparatus, a combustion chamber provided with a dome-like roof and a rear wall extending to a point relatively close to the bottom of the combustion chamber, whereby the products of combustion are momentarily retarded and held in said combustion chamber, a flue chamber located over said combustion chamber and a passageway leading from under said rear wall of the combustion chamber to said flue chamber, a series of units of hot water coils arranged along three sides and the roof of the combustion chamber, said coil units having equal heating surfaces, whereby the total volume of water to be heated is divided into smaller independent volumes and the heating surface of the coils is relatively increased, the return pipes of the apparatus being connected in groups to the coil units, respectively, a hot water drum centrally located in said flue chamber to which said coil units are connected.

3. In a hot water heating apparatus, a combustion chamber provided with a dome-like roof and a rear wall extending to a point relatively close to the bottom of the combustion chamber, whereby the products of combustion are momentarily retarded and held in said combustion chamber, a flue chamber located over said combustion chamber and a passageway leading from under said rear wall of the combustion chamber to said flue chamber, a series of units of hot water coils arranged along three sides and the roof of the combustion chamber, said coil units being alternately intercoiled, whereby the total volume of water to be heated is divided into smaller independent volumes and the heating surface of the coils is relatively increased, the return pipes of the apparatus being connected in groups to the coil units, respectively, a hot water drum centrally located in said flue chamber to which said coil units are connected.

4. In a hot water heating apparatus, a combustion chamber provided with a dome-like roof and a rear wall extending to a point relatively close to the bottom of the combustion chamber, whereby the products of combustion are momentarily retarded and held in said combustion chamber, a flue chamber located over said combustion chamber and a passageway leading from under said rear wall of the combustion chamber to said flue chamber, a baffle element provided in said flue chamber arranged to further retard the said products of combustion, a series of units of hot water coils arranged along three sides and the roof of the combustion chamber, a hot water drum centrally located in said flue chamber to which said coil units are connected.

5. In a water heating apparatus, a combustion chamber provided with a rear wall extending to a point relatively close to but above the bottom of the combustion chamber, a flue chamber located over said combustion chamber and a passageway leading from under said rear wall of the combustion chamber to said flue chamber, units of hot water coils arranged along three sides and the roof of the combustion chamber, said units being alternately intercoiled, whereby the total volume of water passing through the coils is divided into smaller independent volumes, and the heating surface of the coils is relatively increased, a hot water drum centrally located in said flue chamber to which said coil units are connected.

6. In a water heating apparatus, a combustion chamber provided with a rear wall extending to a point relatively close to but above the bottom of the combustion chamber, the lower section of said rear wall being adjustable to relieve the draft, a flue chamber located over said combustion chamber and a passageway leading from under said rear wall of the combustion chamber to said flue chamber, a baffle element provided in said flue chamber to further retard said products of combustion, units of hot water coils arranged along three sides and the roof of the combustion chamber, said units being alternately intercoiled, whereby the total volume of water passing through the coils is divided into smaller independent volumes, and the heating surface of the coils is relatively increased, the return pipes of the apparatus being connected in groups to the inlet ends of said coil units, respectively, a hot water drum centrally located in said flue chamber to which said coil units are connected.

CARL A. W. VOIGT.